(12) United States Patent
Gay et al.

(10) Patent No.: US 6,260,795 B1
(45) Date of Patent: Jul. 17, 2001

(54) OYA COMPUTERIZED GLIDER

(76) Inventors: Kenneth Earl Gay, #D-15601 3-E-113, San Quentin, CA (US) 94964; Marc Margulies, 3014 Bayview, Alameda, CA (US) 94501

( * ) Notice: Subject to any disclaimer, the term of this patent is extended or adjusted under 35 U.S.C. 154(b) by 0 days.

(21) Appl. No.: 09/089,602

(22) Filed: Jun. 2, 1998

(51) Int. Cl.$^7$ ........................................... B64C 3/38
(52) U.S. Cl. .................... 244/16; 198/200; 198/203; 198/75 R; 198/76 R; 198/219
(58) Field of Search ............... 244/13, 16, 75 R, 244/76 R, 133, 123, 219, 204, 198, 200, 203, 205, 199, 215, 201, 130, 22, 11, 72, 194–195

(56) References Cited

U.S. PATENT DOCUMENTS

| | | | |
|---|---|---|---|
| 1,679,356 | * 8/1928 | Grunewald | 244/22 |
| 1,783,029 | * 11/1930 | White | 244/72 |
| 4,473,665 | * 9/1984 | Martin-Vvendensky et al. | 244/133 |
| 4,516,747 | * 5/1985 | Lurz | 244/130 |
| 4,591,111 | * 5/1986 | Laughter | 244/16 |
| 4,741,503 | * 5/1988 | Anderson et al. | 244/203 |
| 4,845,357 | * 7/1989 | Brennan | 244/195 |
| 4,932,611 | * 6/1990 | Horikawa | 244/203 |
| 5,082,207 | * 1/1992 | Tulinius | 244/203 |
| 5,218,863 | * 6/1993 | Mangalam | 244/203 |
| 5,529,458 | * 6/1996 | Humpherson | 244/219 |
| 5,578,761 | * 11/1996 | Clark et al. | 244/204 |
| 5,662,294 | * 9/1997 | Maclean et al. | 244/201 |
| 5,737,222 | * 4/1998 | Palmer | 244/203 |
| 5,740,991 | * 4/1998 | Gleine et al. | 244/215 |
| 5,887,828 | * 3/1999 | Appa | 244/219 |

* cited by examiner

Primary Examiner—Galen L. Barefoot

(57) ABSTRACT

The Oya glider is a modified hang-glider that incorporates many advanced aerospace technologies, such as, glues, for binding Shape Memory Alloy materials to Piezoelectric Ceramic Strips, and synthetic feathers. Lightweight composite plastic materials treated with the MuCell Process, both for framing and chassis construction. Piezoelectric Sensors and Actuators. Nano wires, and nano cables, for electrical connections and manual control levers. Computer firmware and software, designed to mimic, in real time, the aerodynamic flight reactions to external wind conditions, of a gliding bird. The Oya computerized glider will come as close as technologically possible to imitating a bird's mastery of the wind.

7 Claims, 5 Drawing Sheets

OYA ELECTRONIC SYSTEM DIAGRAM

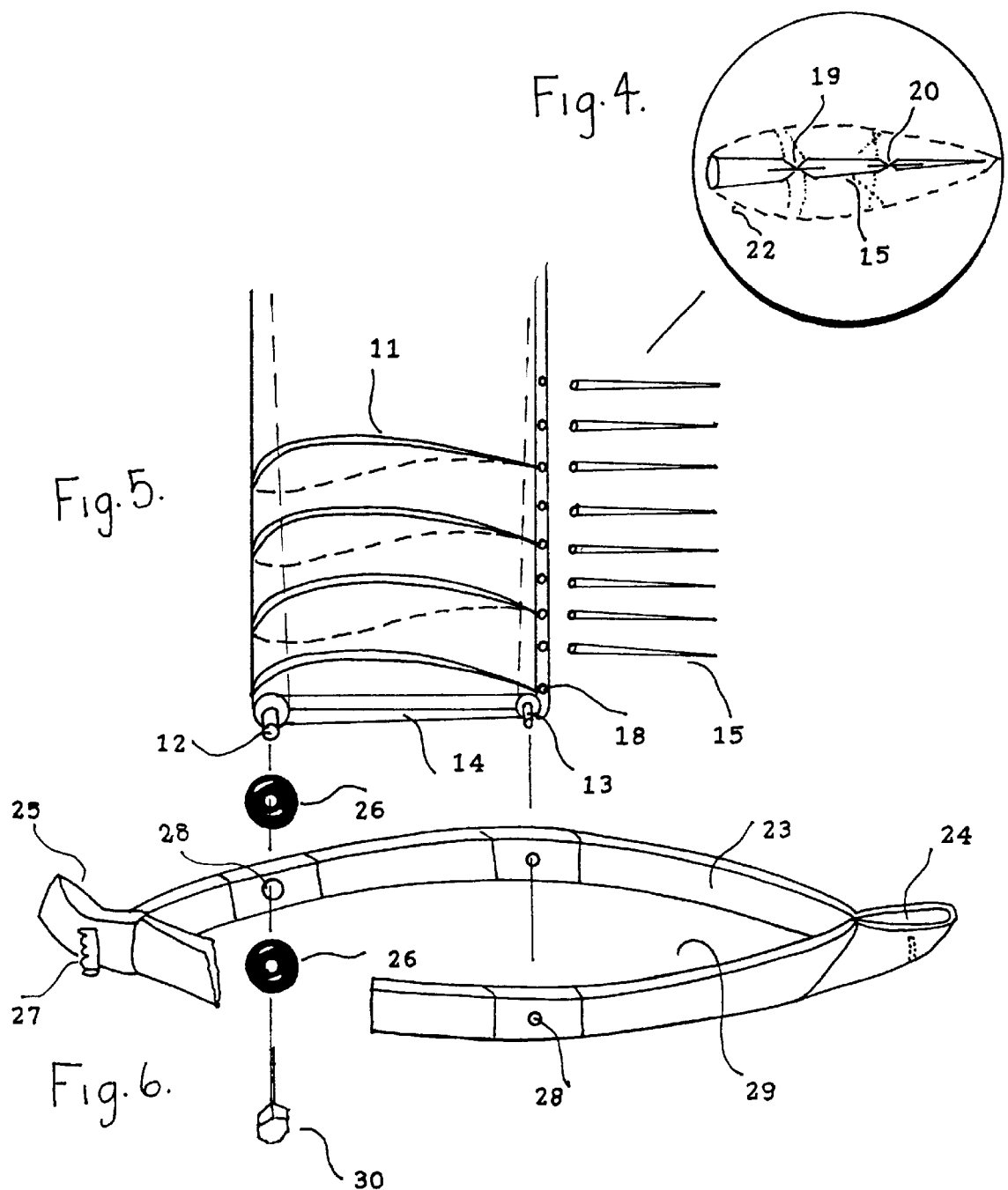

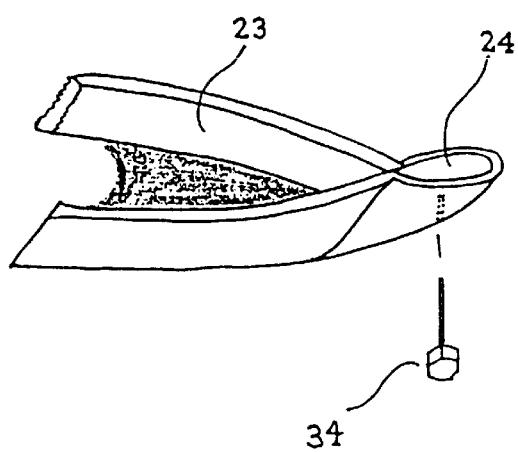
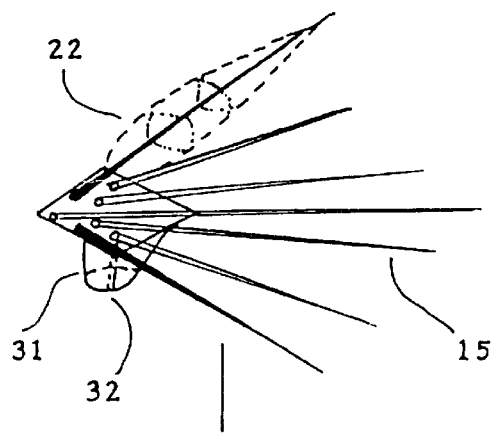
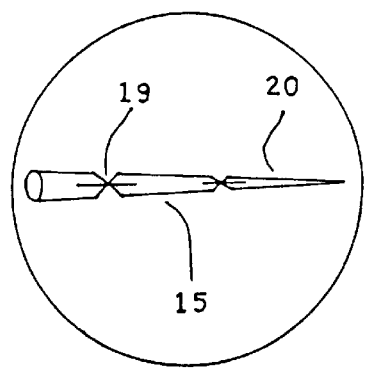
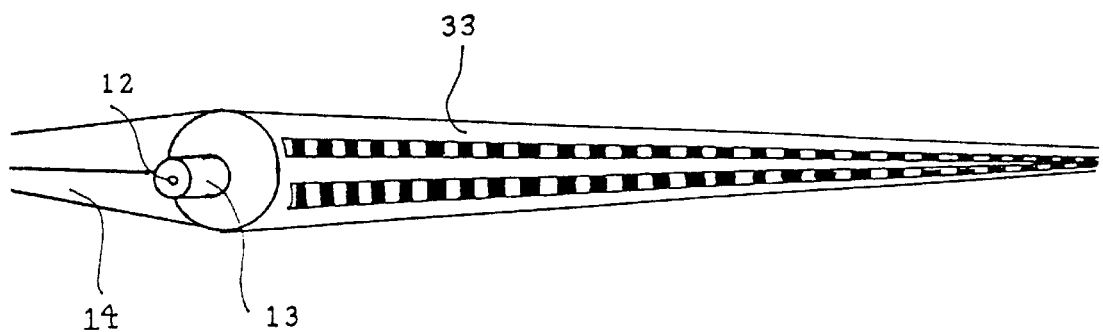

OYA SYSTEM FLOW CHART

OYA COMPUTERIZED GLIDER

BACKGROUND OF THE INVENTION

1. Field of Invention

The present invention relates to the field of aviation. Specifically, gliders. The instant glider is unlike any known conventional glider, in-so-far-as it incorporates many new technologies into a single application, while eliminating many of the problems associated with conventional gliders.

2. Description of Prior Art

Traditionally, gliders have depended upon the use of cables, hydraulics, torsion rods, lever arms, and pilot skill, as a means of altering the control surfaces of the wings. Advances in fixed winged gliders, and electronic sensoring devices, have given gliders better performance. However, the use of electronic devices have added weight and complexity to these systems, which limit their glide/descent ratios and make them difficult to operate efficiently. One aspect of hang-glider design that has proven ineffectual is the wing's leading edge designs. The current designs make it necessary for the pilot to feel for updrafts and other wind phenomena and physically push or pull the torsion rod to direct airflow over or under the wing's leading edge. This makes hang-gliding ineffectual and dangerous for beginners.

The instant invention uses a double row of Piezoelectric Ceramic Strip Actuators (PCSA) covered by synthetic feathers along the leading edge of the wing. These feathers mimic the function of the Aluale feathers of a bird. By computer the pilot commands these feathers to rise or lower, which directs airflow over or under the surface of the wings. The pilot no longer has to feel for wind phenomena, or push and pull on a torsion rod. He/she inputs their desired direction into the computer and the PCSA alter their shape to achieve the pilot's desired results, provided the wind is cooperative.

Inventors are familiar with U.S. Pat. No. 4,932,611 entitled, LEADING EDGE FLAP SYSTEM. Granted to MAKOTO HORIKAWA. That prior art uses hot wire anemometers and pressure actuators to rotate the wing's surface. The instant invention shares no similarities with this prior art.

The instant invention uses Piezoelectric Ceramic Strips as sensors and as actuator/muscles. The skin, or surface, of the wing does not move. Nor does the instant invention use hot wire anemometers as sensors.

Fixed wing gliders have become larger and heavier as more electronic systems are added. These gliders, because of their weight, require an automobile or a motorized aircraft to tow them aloft. Both hang-gliders and fixed wing gliders share similar deficiencies, such as weight, poor glide/descent ratios, and pilot's skill, as performance factors. The instant invention is constructed using high-tech lightweight materials. Cables, torsion rods, and heavy canvas, have been eliminated. The control surfaces are manipulated by an onboard computer. The pilot inputs his/her desired directions into the computer and the computer directs the PCSA to alter the control surfaces to conform to the shape best suited to achieve those desired results. This eliminates pilot's skill as a performance factor.

Inventors are familiar with U.S. Pat. No. 5,662,294. Granted to Brian J. Maclean, entitled: "ADAPTIVE CONTROL SURFACE USING ANTAGONISTIC SHAPE MEMORY ALLOY TENDONS." That system uses shape memory alloy in conjunction with electronically heated hot wire tendons to alter the shape of a conventional airplane wing. The instant invention shares no similarities with the prior art.

The instant invention uses shape memory alloy (SMA) as a fixed Rachis/Vein of each synthetic feather. This fixed position allows the computer firmware (CF) to determine the amount of stress (by external wind flows) being applied to each feather in relationship to its known, or fixed position. In the instant invention the SMA is not heated, elongated, or deliberately altered in any fashion.

SUMMARY OF INVENTION

It is the inventor's objective to overcome the numerous limitations of conventional hang-gliders by using a combination of leading edge technologies, such as, the current aerodynamic statistical data on the gliding characteristics of birds in flight, combined with real time computing, and lightweight plastic construction using the MuCell Process. And Piezoelectronic Ceramic Strips as sensors and actuators to measure and react to external airflow's in real time.

The instant invention will seek to duplicate the external design of the California Condor, or other large bird, but on a larger scale. The Condor's ability to master the science of gliding stems from several basic factors. To duplicate these factors inventor's will overcome the following limitations.

Weight. Unlike conventional hang-gliders that use heavy canvas and aluminum torsion rods, and steal cables, the instant invention will be constructed of lightweight plastics. By utilizing the "MuCell Process" wherein materials like Polypropylene and Modacrylics are infused, during their manufacturing, with molecules from gases like Helium, making them stronger and lighter than conventional plastics.

The "MuCell Process," was developed at MIT by NAM P. SUH and DAVE BERNSTEIN. Also see, "Trexel Inc. Alusuisse-Lona, of Zurich." The process involves the infusion of Helium molecules into plastics during their manufacturing process, to create a stronger, lighter, plastic composite material.

Sensors. The Condor uses small feather sensors, located on either side of its nose, to detect external airflow. The instant invention uses Piezoelectric Ceramic Strips (PCSS) as sensors. These PCSS are embedded into Shape Memory Alloy (SMA) Rachis' along the control surfaces, the Rachis' are covered by small synthetic feathers, (Barbs & Barbules), airflow's strike these feathers causing movement, which in turn causes an electrical signal which is sent to the computer's firmware. (CF) The PCSS provide the CF with continuous information about external airflow's, and control surface attitudes. The PCSS monitor the airflow's over and under the wings surfaces, and the CF directs the PCSA to alter their shapes to maximize upon external airflow's.

Real time reactions. The key factor in the Condor's ability to maximize the winds power is its ability to react (in real time) to changing external airflow's. The instant invention uses Computer Firmware to mimic the Condor's reactions. The CF is programmed to consider the external airflow's, given variables, pre-programmed possibilities, accepted limitations, and based upon the pilot's instructions, provide the control surfaces (PCSA) with an allowable solution to maintain maximum gliding efficiency.

Real time corrections to control surfaces. The CF will assess external airflow's and pilot's instructions, work out an allowable solution based upon known flight characteristics, and relay those instructions to the PCSA. This gives the system the ability to assess external conditions, (in real time) and (in real time) make corrections to the control surfaces.

By combining a bird's mastery of aerodynamics (on a computer program), with lightweight plastic construction, inventor's will overcome the disadvantages associated with conventional hang-gliders. And because the instant invention uses a computer to sense and react to airflow's, pilot skill is eliminated as a performance factor, making it possible for beginning pilots to master this device quickly. This invention is lightweight enough, and smart enough, to lift off upon a gentle breeze, thereby eliminating the need to be towed aloft by a conventional aircraft.

It was in an effort to overcome the many disadvantages of traditional prior art that the instant invention was conceived.

BRIEF DESCRIPTION OF DRAWINGS

FIG. 4. Depicts synthetic feather covering of Shape Memory Alloy Rachis and Piezoelectric Ceramic Strip Sensors and Piezoelectric Ceramic Strip Actuators embedded inside the Shape Memory Alloy Rachis.

FIG. 5. Depicts right wing, struts, posts, framing, Shape Memory Alloy, and their inserts.

FIG. 6. Chassis, wing mount slots, manual control handles, display screen, tail dish, rubber ring mounts, and bolt for assembling wing to chassis.

FIG. 7. Chassis, depicting cut out tail section, and tail dish.

FIG. 8. Tail section, tail mount, threaded tail mount section, and synthetic covering of Rachis.

FIG. 9. Depicts Piezoelectric Ceramic Strip Actuators and Sensors, embedded in Shape Memory Alloy Rachis.

FIG. 10. Depicts leading edge design of wing. With Piezoelectric Ceramic Strip Actuators and Piezoelectric Ceramic Strip Sensors along the leading edge of the wing.

Figure 1:
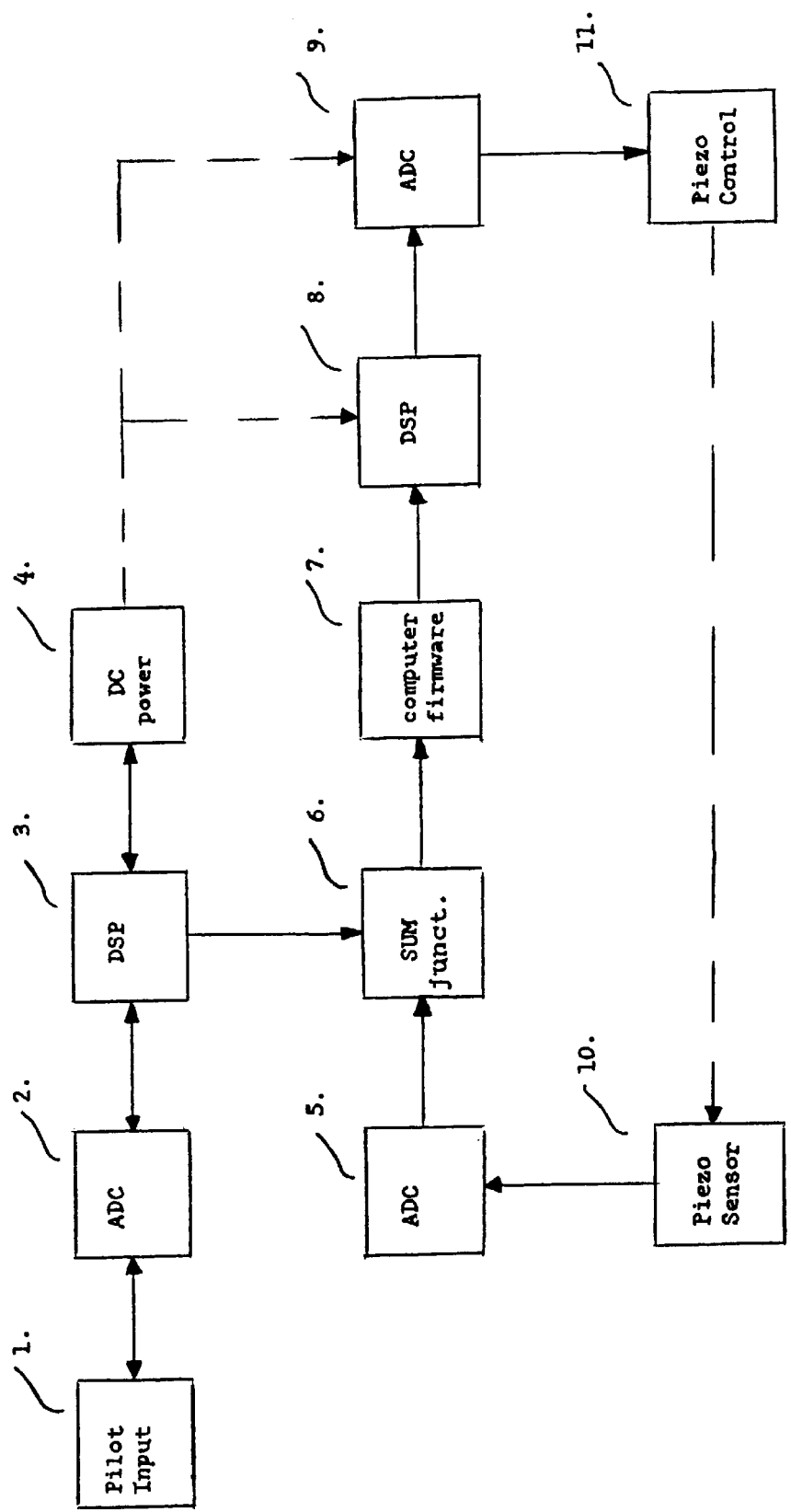
FIG. 1. Depicts a diagram of the electronic control system of the Oya Glider.
Figure 2:
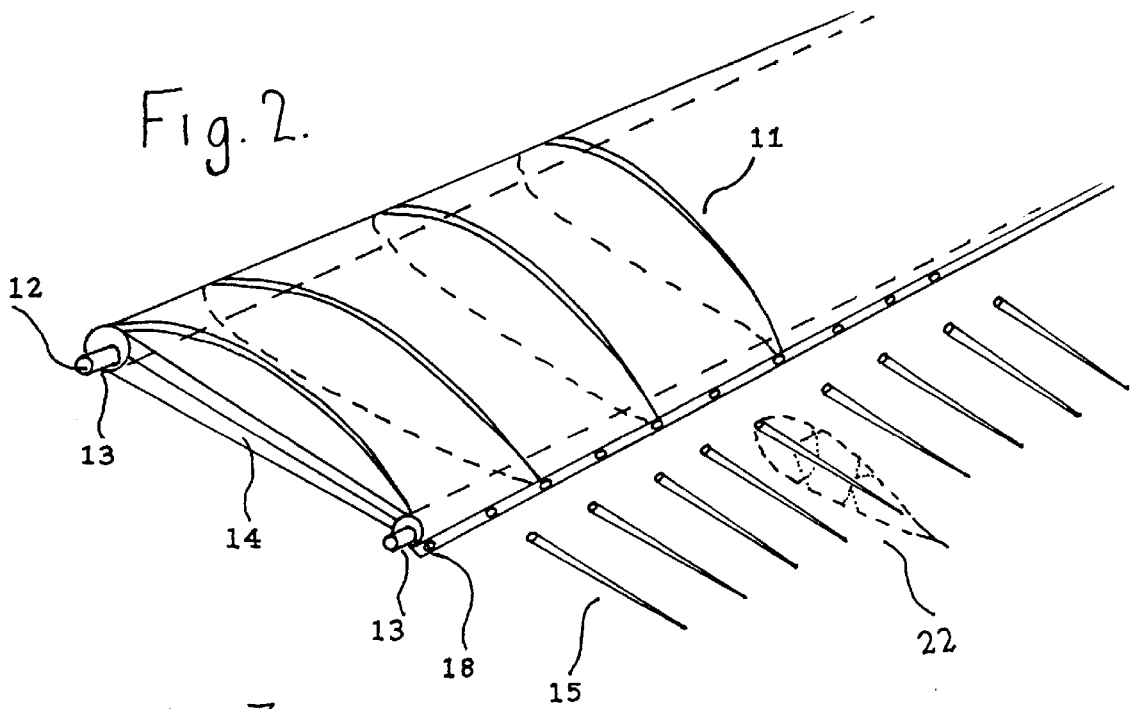
FIG. 2. Depicts right wing framing and complimentary struts and Shape Memory Alloy components.

Although unable to depict, for purposes of clarification, FIG. 5, at 18, are a set of pre-drilled holes in the wing's trailing edge. The Shape Memory Alloy Rachis/Vein shown at FIG. 5, # 15, Rachis are glued into these pre-drilled holes at a precise angle, and calibrated by the computer system.

FIG. 4 is a close up of one individual Rachis with PCSA & PCSS embedded in the trailing edge. Each Rachis is covered with synthetic feathers and fashioned into the trailing edge assembly. Their precise position and angles are calibrated into the computer firmware, providing the system with a known, or fixed position. Each feather, when struck by wind, produces its own stresses, which are monitored by the system's onboard computer.

DETAILED DESCRIPTION OF DRAWINGS
FIG. 1.

(1) Pilot input is achieved by the pilot pressing a series of buttons located on the Manual Control Handles. See FIG. 6,27. The pilot's instructions include, but aren't limited to, ascend, descend, dive, left/right turns, glide, drift, or searching to find up-drafts. These instructions are sent directly to the Analog/Digital Converter.

(2) The Analog/Digital Converter (ADC) converts pilot's instructions, which are in analog form, into digital signals, which are sent directly to the Digital Signal Processor.

(3) The Digital Signal Processor (DSP) processes incoming digital signals and relays them to the Summing Junction.

(6) The Summing Junction (SJ) processes all incoming data, such as pilot's instructions, external conditions, (measured by PCSS, see FIG. 10) wind direction, wind speed, control surface attitudes, etc., and determines what options are allowable given the Sum total of all variables. The SJ will then send an acceptable instruction to the Computer Firmware.

(7) The Computer Firmware (CF) contains all known flight characteristics (alogorithms) of a bird's gliding capabilities. Information such as wing flap angles, rudder position, aileron angles, etc., are pre-programmed into the computer firmware. By pre-programming the CF to recognize the optimum glide attitudes, the system can Sum the totals, work out a solution, and send commands to the DSP, which instantly corrects wing attitude for best flight performance. The signal produced by the CF is sent to a second DSP.

(8) The Digital Signal is processed and relayed to a second Analog/Digital Converter.

(9) This second Analog/Digital Converter (ADC) is responsible for sending a analog signal, along with an electrical charge, (See DC power at # 4) to a Piezoelectric Ceramic Strip Actuator.

(11) The Piezoelectric Ceramic Strip Actuator (PCSA) are strategically positioned along the control surfaces of the wing and tail sections. They are the muscles, or motors, of the system. When PCSA receive an electrical charge from the DC power supply they alter their shapes to a predetermined and regulated angle. One PCSA and one PCSS are embedded in each Rachis/Vein using heat and glue. See FIG. 9,19. Each Rachis is made of Shape Memory Alloy. (SMA) A material that maintains its shape after repeated distortions. Each SMA/PCSS/PCSA is covered by a synthetic feather material that has undergone the MuCell Process to reduce its weight. By embedding one PCSS and one PCSA in each SMA Rachis, each feather is capable of operating independently or in conjunction with other feathers. Giving each feather, or row of feathers, the ability to sense wind direction and speed, and change shape to meet pilot's desires and optimum glide efficiency. Because PCSA are incapable of precise movements, each PCSA works in cooperation with its own PCSS that acts solely as its Sensor, constantly monitoring the feathers position, while the CF constantly makes corrections to the corresponding PCSA.

(10) The Piezoelectric Ceramic Strip Sensor (PCSS) are used in conjunction with Shape Memory Alloy. (SMA) See FIG. 9,19. The Rachis of each feather is constructed using SMA, embedded with one PCSS and one PCSA. These SMA/PCSS/PCSA Rachis' are positioned in the wing's frame in a manner consistent with optimum gliding performance. So without the application of electrical power the mechanical design maintains the ability to glide efficiently. When wind strikes any control surface, (feathers) it places stresses on the PCSS, which produces an electrical charge. This charge acts as a sensor, informing the CF of the control surface position at all times. Because the SMA always returns to its original position, the CF has a constant, or "norm" to compare the actual position of each PCSA, with it's constant or known position. The ability of each PCSS to produce its own electricity, as a result of wind induced stresses, means that the sensors do not require electrical power. This allows the system to produce the power it needs to sense the external conditions. And conserves DC battery power for use by the PCSA.

By using a computer program and Piezoelectric Ceramic Strips, continuous alterations to the control surfaces can be achieved with minimal consumption of electrical power. And with the addition of a small capacitor, PCSS power can be stored and re-directed for use by the PCSA. (Not shown in system diagram)

It is important to note that the mechanical design of this device allows it to achieve standard glider performance without the introduction of electrical power. By introducing a computer program capable of sensing (in real time) external conditions, and responding (in real time) by the use of Piezoelectronics, it is possible to produce subtle changes in the control surfaces continuously These intuitive and spontaneous changes to the control surfaces gives this device the ability to mimic a bird's gliding capabilities.

FIG. 2.

Depicts the right wing's framing. The wing is constructed using polypropylene (plastics) treated with the MuCell Process. See Summary of invention. Number 11 depicts the center struts of the wing's framing. These struts provide strength and contour for the modacrylic plastic membrane (skin) that covers the entire wing surface. Number 12 is a depiction of the treaded holes that accept the bolts, FIG. 6, # 30, once the wing is attached to the chassis. FIG. 6 # 23. Number 13 is the post of the wing's leading edge that inserts into the chassis, See FIG. 5&6 at # 28. The two rubber rings, shown at FIG. 5&6 at # 26, are inserted on either side of the chassis before wings are affixed, assembly is completed when the bolt, 30, is inserted and tightened.

FIG. 3.

Figure 3:
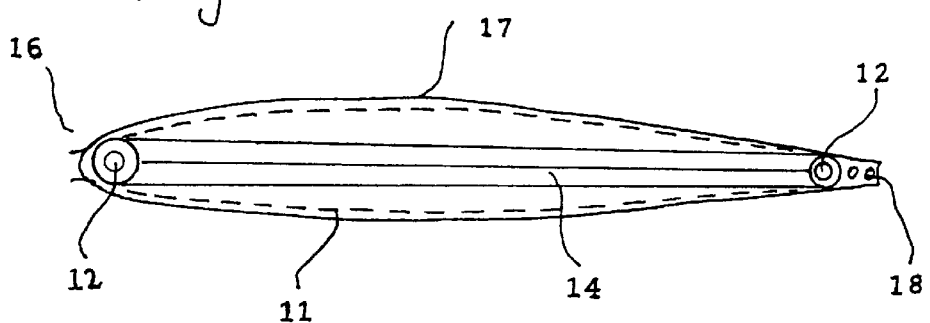
FIG. 3. Depicts side view of right wing. Surface skin covering of struts and framing along the leading edge Piezoelectric Ceramic Strip Actuators.
Figure 11:
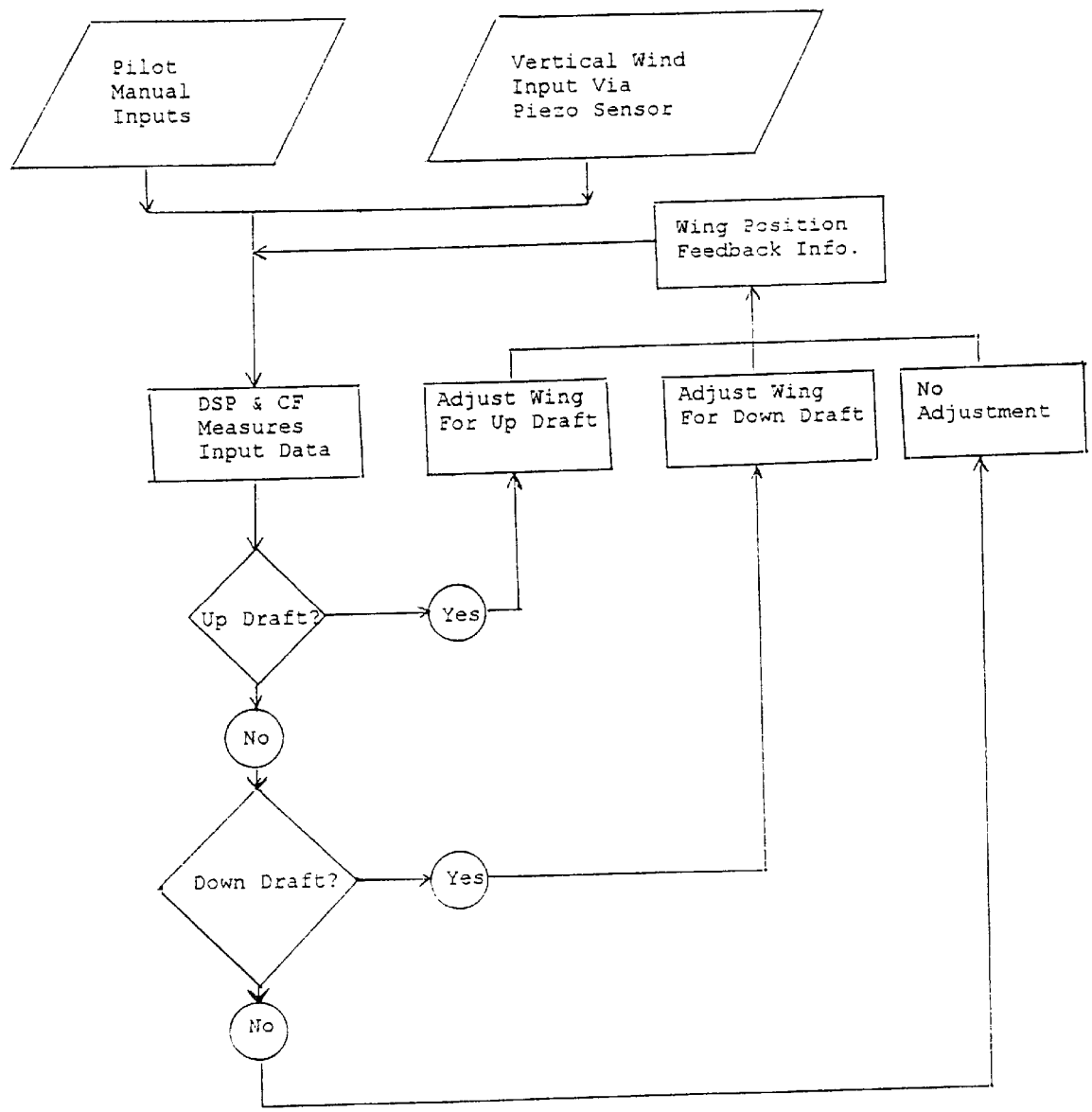
FIG. 11. Flow Chart which explains, in detail, the step by step operational and assembly process.

Depicts a side view of right wing. 16 is a side view of the leading edge Piezoelectric Ceramic Strip Actuators. (PCSA) Also see FIG. 10 at 33. 17 illustrates the modacrylic membrane (skin) covering the center struts. FIG. 3 at 16 provides an illustration of what the top and bottom PCSA would look like if they were activated simultaneously. In operation they rise or lower independently, separating and directing airflow's over or under the leading edge of the wing's surface.

FIG. 4.

Close up of the individual Shape Memory Alloy (SMA) Rachis/Vein 15, with PCSS 19, and PCSA 20, covered by 22, a synthetic feather covering. Feathers are glued into pre-cut slots in SMA Rachis veins. One PCSA and one PCSS are embedded in each Rachis vein. See FIG. 4 at 19 & 20.

FIG. 5 & 6.

Depiction of right wing of frame and how it is attached to the chassis. The frame's leading edge post, 13, is inserted into the chassis' frame at FIG. 6, 28. On either side of rubber rings # 26 is inserted to provide shock absorbsion and limited wing flexibility. 15 illustrates the SMA Rachis before being attached to the trailing edge of the wing's frame at FIG. 5, 15 & 18. Once rubber rings are inserted, a bolt, see FIG. 6, 30, is inserted to complete assembly.

FIG. 6.

Number 25 is the display monitor. This L-E-D display will assist the pilot with information such as altitude, direction, battery life, and operational status of the invention. 27 is the and-held manual control system. These handles, located on either side of the display screen, are connected by thin cables, that are threaded through the hollow chassis, to the tail section. By pulling on the manual control handles, the pilot can alter, manually, the function of the rudder, or tail section feathers. This adds safety and stability to landings. 29 depicts the electronic bay. This is the area where all electronic components will be fastened and secured.

FIG. 7.

Cut out of tail section showing tail dish, and bolt insert.

FIG. 8.

Is an illustration of the tail section. This tail section is inserted, 31, into FIG. 7, 24. A bolt, see 34, is inserted through the bottom of the tail and secured to the chassis.

FIG. 9.

Close up of tail section SMA Rachis 15, with PCSS, 19, and PCSA 20. When synthetic feathering is struck by airflow's, the movement generates an electrical current which is sent to the computer Firmware, which in turn directs a DC electrical current to the PCSA, 20, which then alter their shapes.

FIG. 10.

This is the leading edge frame without the struts, or modacrylic membrane covering. Illustrated at 33 (in black) are the individual PCSA and PCSS that line the entire length of the leading edge of the wing. These PCSS and PCSA will rise and lower, causing air to flow over or under the wing's surface. These PCSA and PCSS are covered by tiny synthetic feathers.

FIG. 11.

This is a flow chart, which depicts the operational and assembly process of this invention.

What is claimed is:

1. An aircraft having a lifting surface and control means comprising: a plurality of synthetic feathers on said lifting surface, at least some of said feathers including airflow sensing means and actuator means located thereon such that when airflow strikes said at least some feathers causing movement thereof a corresponding signal is sent from the sensing means to the control means which in turn sends a control signal to the actuator means on said at least some of said feathers thereby altering the shape of said at least some feathers and thereby controlling the lift on said lifting surface.

2. An aircraft having a lifting surface and control means as set forth in claim 1 and further comprising: a pilot input means that sends a pilot control signal to said control means and thereby alters the shape of said at some feathers to provide pilot control of the lift on said lifting surface.

3. An aircraft having a lifting surface and control means as set forth in claim 1 and further comprising: said sensing means comprises a piezoelectric ceramic strip sensor attached to a rachis/vein of said at least some feathers and said actuator means comprises a piezoelectric ceramic strip actuator attached to a rachis/vein of said at least some feathers.

4. An aircraft having a lifting surface and control means as set forth in claim 1 and further comprising: said lifting surface is made of a lightweight plastic material that is made by the infusion of Helium molecules into the plastic to create a stronger, lighter, plastic composite material.

5. An aircraft having a lifting surface and control means as set forth in claim 1 and further comprising: said piezoelectric ceramic strip sensor produces its own electrical signal, as a result of airflow induced stresses, that allows it to sense the external conditions about said lifting surface without the need for external battery power.

6. An aircraft having a lifting surface and control means as set forth in claim 1 and further comprising: said feathers are arranged in rows along said lifting surface and with said piezoelectric ceramic strip sensors and said piezoelectric ceramic strip actuators embedded in each feather, said feathers are capable of operating independently or in conjunction with other feathers to sense wind direction and speed, and in cooperation with said control means to change shape to meet pilot's desires and optimum glide efficiency.

7. An aircraft having a lifting surface and control means as set forth in claim 1 wherein said aircraft is a glider and said lifting surface comprises a wing and tail sections.

* * * * *